United States Patent Office 3,356,772
Patented Dec. 5, 1967

3,356,772
O-ALKYL-O-HALOPHENYL-ALKYL-THIOPHOSPHONATES
Wolfgang Buck, Richard Sehring, and Karl Zeile, Ingelheim (Rhine), Germany, assignors to C. H. Boehringer Sohn, Ingelheim am Rhine, Germany, a limited partnership of Germany
No Drawing. Filed Apr. 17, 1964, Ser. No. 360,769
Claims priority, application Germany, Apr. 29, 1963, B 71,701
5 Claims. (Cl. 260—961)

This invention relates to novel O-alkyl-O-halo-phenyl-alkyl-thiophosphonates, to insecticidal compositions comprising the novel thiophosphonates as active ingredients and to a method of killing insects with said novel thiophosphonates.

More particularly, the present invention relates to thiophosphonates of the formula

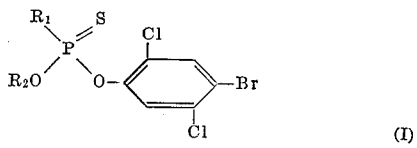

wherein $R_1$ and $R_2$ are each selected from the group consisting of acyclic hydrocarbons of 1 to 4 carbon atoms, especially alkyl of 1 to 4 carbon atoms.

The thiophosphonates of the present invention may be prepared by a variety of methods involving well known chemical principles; however, among these the process comprising reacting an alkali metal salt of 2,5-dichloro-4-bromo-phenol with a thiophosphonic acid chloride of the formula

wherein $R_1$ and $R_2$ have the same meanings as in formula I, has proved to be particularly advantageous. The reaction is performed at room temperature or at elevated temperatures, preferably at 20–100° C., in the presence of water or of an inert organic solvent, such as benzene.

The thiophosphonic acid chlorides (II), which are used as starting materials in the above process, may themselves be prepared by known methods, such as that described by F. W. Hoffmann et al., J.A.C.S. 80, 3945 (1958).

The following examples illustrate the present invention and will enable others skilled in the art to understand it more completely. It should be understood, however, that the invention is not limited to the particular examples given below.

EXAMPLE 1

*Preparation of O-ethyl-O-(2,5-dichloro-4-bromo-phenyl)-ethyl-thiophosphonate*

2.3 gm. of sodium in 50 cc. of absolute ethanol were added to a solution of 24.2 gm. (0.1 mol) of 2,5-dichloro-4-bromo-phenol in 200 cc. of benzene, yielding a solution of sodium 2,5-dichloro-4-bromo-phenolate. To this solution, heated to 60° C., 17.2 gm. (0.1 mol) of O-ethyl-ethylthiophosphonic acid chloride were added dropwise while stirring. After all of the thiophosphonic acid chloride had been added, the reaction mixture was stirred for two hours more at 60° C. Thereafter, the reaction mixture was allowed to cool and was subsequently shaken first with 2N sodium hydroxide and then with water. The aqueous phases were separated and discarded. The organic phase was dried and the solvent mixture was distilled off in vacuo. 32.5 gm. (86% of theory) of a yellowish oil remained behind, which was identified to be O-ethyl-O-(2,5-dichloro-4-bromo-phenyl)-ethyl-thiophosphonate of the formula

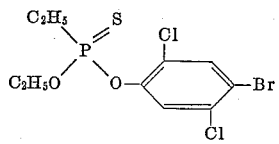

*Analysis.*—Calculated: P, 8.18%; S, 8.46%. Found: P, 7.95%; S, 7.61%.

EXAMPLE 2

Using a procedure analogous to that described in Example 1, O-methyl-O-(2,5-dichloro-4-bromophenyl)-ethyl-thiophosphonate of the formula

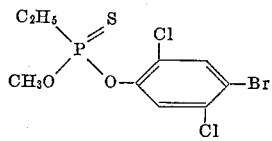

was prepared from sodium 2,5-dichloro-4-bromo-phenolate and O-methyl-ethyl-thiophosphonic acid chloride. The yield was 82.3% of theory.

*Analysis.*—Calculated: P, 8.46%; S, 8.79%. Found: P, 8.70%; S, 8.84%.

EXAMPLE 3

Using a procedure analogous to that described in Example 1, O-isopropyl-O-(2,5-dichloro-4-bromo-phenyl)-methyl-thiophosphonate, M.P. 51° C. (recrystallized from methanol), of the formula

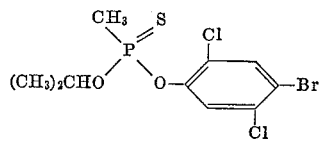

was prepared from sodium 2,5-dichloro-4-bromo-phenolate and O-isopropyl-methyl-thiophosphonic acid chloride. The yield was 81.6% of theory.

*Analysis.*—Calculated: P, 8.15%; S, 8.45%. Found: P, 8.57%; S, 8.74%.

EXAMPLE 4

Using a procedure analogous to that described in Example 1, O-ethyl-O-(2,5-dichloro-4-bromo-phenyl)-methyl-thiophosphonate of the formula

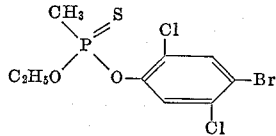

was prepared from sodium 2,5-dichloro-4-bromo-phenolate and O-ethyl-methyl-thiophosphonic acid chloride. The yield was 82.5% of theory.

*Analysis.*—Calculated P, 8.46%; S, 8.79%. Found: P, 8.61%; S, 8.94%.

EXAMPLE 5

Using a procedure analogous to that described in Example 1, O-isopropyl-O-(2,5-dichloro-4-bromo-phenyl)-ethyl-thiophosphonate of the formula

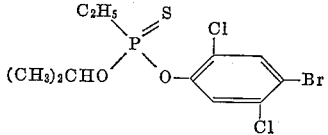

was prepared from sodium 2,5-dichloro-4-bromo-phenolate and O-isopropyl-ethyl-thiophosphonic acid chloride.

EXAMPLE 6

Using a procedure analogous to that described in Example 1, O-n-propyl-O-(2,5-dichloro-4-bromo-phenyl)-methyl-thiophosphonate of the formula

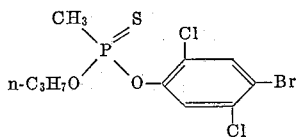

was prepared from sodium 2,5-dichloro-4-bromo-phenolate and O-n-propyl-methyl-thiophosphonic acid chloride.

EXAMPLE 7

Using a procedure analogous to that described in Example 1, O-n-butyl - O - (2,5-dichloro-4-bromo-phenyl)-methyl-thiophosphonate of the formula

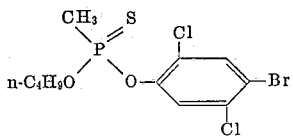

was prepared from sodium 2,5-dichloro-4-bromo-phenolate and O-n-butyl-methyl-thiophosphonic acid chloride.

EXAMPLE 8

*Preparation of O-methyl-O-(2,5-dichloro-4-bromo-phenyl)-methyl-thiophosphonate*

285 gm. of 2,5-dichloro-4-bromo-phenol were dissolved in 108 gm. of an aqueous 48% sodium hydroxide solution and 150 cc. of water. To the resulting solution 144.5 gm. of O-methyl-methylthiophosphonic acid chloride were added dropwise at about 40° C. over a period of 25 minutes. Thereafter, the reaction solution was heated at 60° C. for 30 minutes, and was then allowed to cool to 20° C. Subsequently, 100 cc. of 2 N sodium hydroxide were added, the oily precipitate was taken up in 700 cc. of toluene, the toluene solution was dried, and the toluene was distilled off. The residue was identified to be O-methyl - O - (2,5-dichloro-4-bromo-phenyl)-methyl-thiophosphonate of the formula

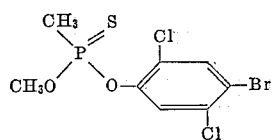

The yield was 78.5% of theory.

*Analysis.*—Calculated: P, 8.80%; S, 9.14%. Found: P, 8.41%; S, 8.55%.

The thiophosphonic acid esters of the present invention, that is, those embraced by Formula I above, have useful properties. More particularly, they exhibit highly effective pesticidal and especially insecticidal activities. They are particularly effective against house flies, plant lice, cockroaches, spider mites and possess excellent compatability on plants.

For insecticidal purposes, the compounds of the present invention are incorporated, by themselves or together with other insecticidal compounds, into liquid or solid inert carriers to form customary insecticidal compositions, such as suspensions, emulsions, solutions, dusting powders and the like. The preferred concentration of the thiophosphonates of the present invention in these compositions is 0.01–3% by weight, based on the total weight of the composition. Such compositions are highly effective contact insecticides and may be disseminated in customary fashion, for instance, by spraying or dusting, so that the insects to be eradicated come in contact therewith.

The following examples illustrate a few insecticidal compositions comprising a compound of the present invention as an active ingredient. The parts are parts by weight unless otherwise specified.

EXAMPLE 9

*Emulsion*

20 parts of O - isopropyl - O - (2,5-dichloro-4-bromo-phenyl)-methyl-thiophosphonate were dissolved in 75 parts of xylene, and then 5 parts of ricinoleic acid butyl ester sulfonate were added to the xylene solution as an emulsifier. The resulting mixture was then emulsified in a sufficient amount of water to achieve a 2% concentration of the active ingredient. The aqueous emulsion thus obtained was highly effective as an insecticidal spray.

EXAMPLE 10

*Dusting powder*

2 parts of O - methyl - O - (2,5-dichloro-4-bromo-phenyl)-ethyl-thiophosphonate were sprayed onto 98 parts of kaolin, and the mixture was then milled until a homogeneous powder was obtained. The powder was a highly effective insecticidal dusting powder.

EXAMPLE 11

*Suspension*

25 parts of O-methyl-O-(2,5-dichloro-4-bromo-phenyl)-ethyl-thiophosphonate were sprayed onto 73 parts of kieselguhr, and then 2 parts of naphthalene sodium sulfonate were added thereto. The resulting mixture was milled until a homogeneous powder was obtained, and the powder was suspended in a sufficient amount of water to achieve a concentration of 2% of the active ingredient. The resulting aqueous suspension was a highly effective insecticidal composition.

Although only two specific thiophosphonates according to the present invention have been illustrated above as active ingredients in insecticidal compositions, it should be understood that any of the other compounds embraced by Formula I above may be substituted for the particular thiophosphonate in Examples 9 to 11. Similarly, the amount of active ingredient may be varied within the limits set forth above, as may the nature and amount of the inert components.

While the invention has been illustrated with the aid of certain specific embodiments thereof, it will be readily apparent to others skilled in the art that the invention is not limited to those embodiments and that various changes and modificaions may be made without departing from the spirit of the invention or the scope of the appended claims.

We claim:

1. A compound of the formula

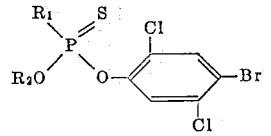

wherein $R_1$ and $R_2$ are each selected from the group consisting of acyclic hydrocarbons of 1 to 4 carbon atoms.

2. A compound of the formula

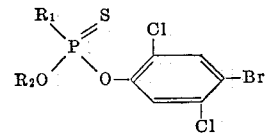

wherein $R_1$ and $R_2$ are each selected from the group consisting of alkyl of 1 to 4 carbon atoms.

3. A compound of the formula

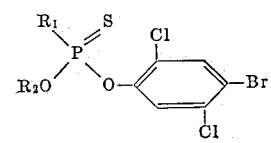

wherein $R_1$ is selected from the group consisting of methyl and ethyl, and $R_2$ is alkyl of 1 to 3 carbon atoms.

4. O-methyl-O-(2,5-dichloro-4-bromo-phenyl)-ethyl-thiophosphonate.

5. O-isopropyl-O-(2,5-dichloro-4-bromo-phenyl)-methyl-thiophosphonate.

References Cited

UNITED STATES PATENTS

| | | | |
|---|---|---|---|
| 3,033,891 | 5/1962 | Grisley | 260—461 |
| 3,076,012 | 1/1963 | Schiche et al. | 260—461 |
| 2,910,402 | 10/1959 | Fairchild | 167—30 |
| 2,914,439 | 11/1959 | Richter | 167—30 |
| 2,668,841 | 2/1954 | Tolkmith | 260—961 |
| 3,149,143 | 9/1964 | Newallis et al. | 260—961 |
| 3,227,610 | 1/1966 | Sehring et al. | 260—964 |

CHARLES B. PARKER, *Primary Examiner.*

JULIAN S. LEVITT, *Examiner.*

V. C. CLARKE, A. H. SUTTO, *Assistant Examiners.*